Sept. 13, 1955  J. C. WARD  2,717,787
SEMI-TRAILER STEERING MECHANISM
Filed Sept. 11, 1953  4 Sheets-Sheet 1
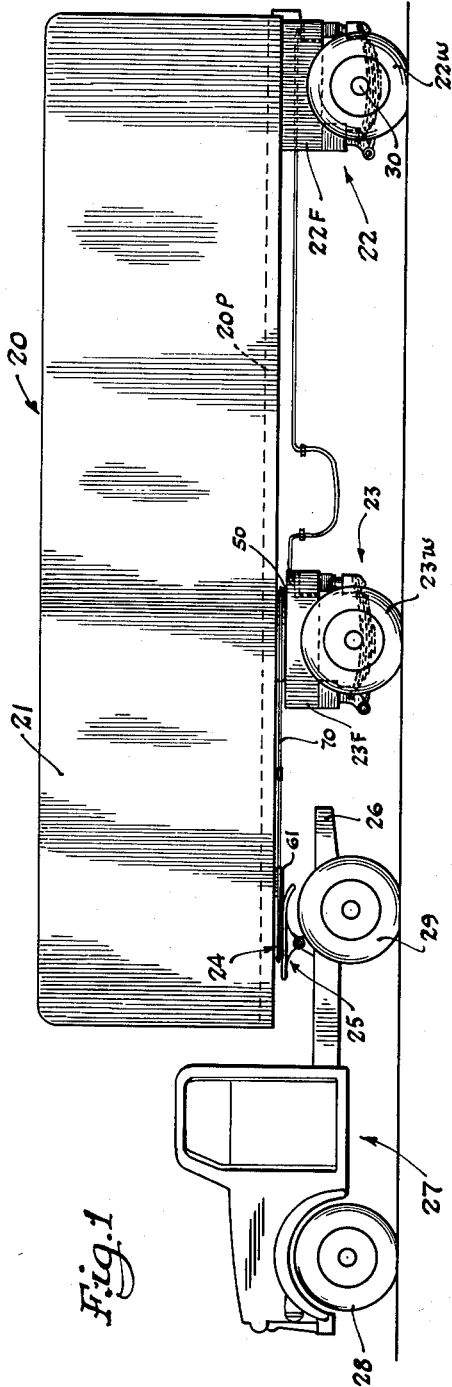
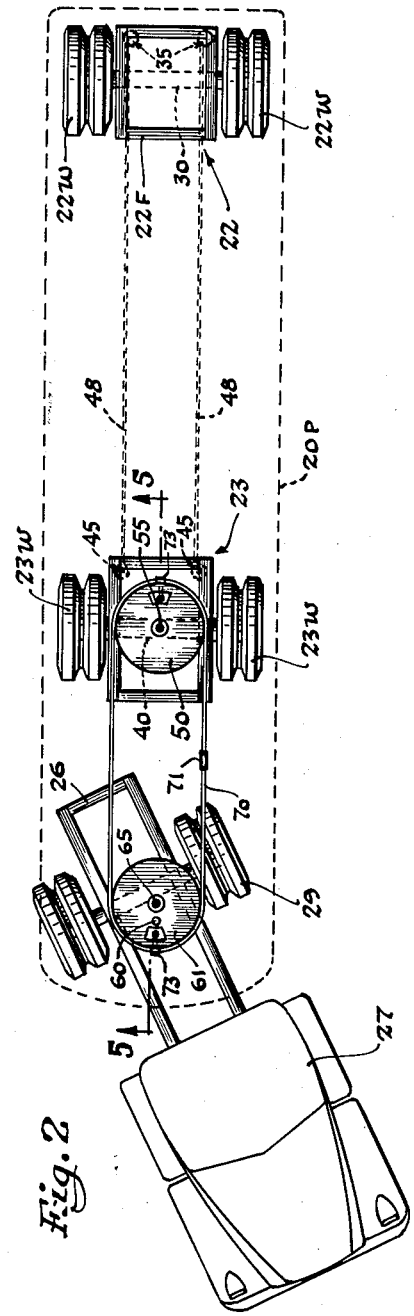
Inventor
James C. Ward
By Wallace and Cannon
Attorneys

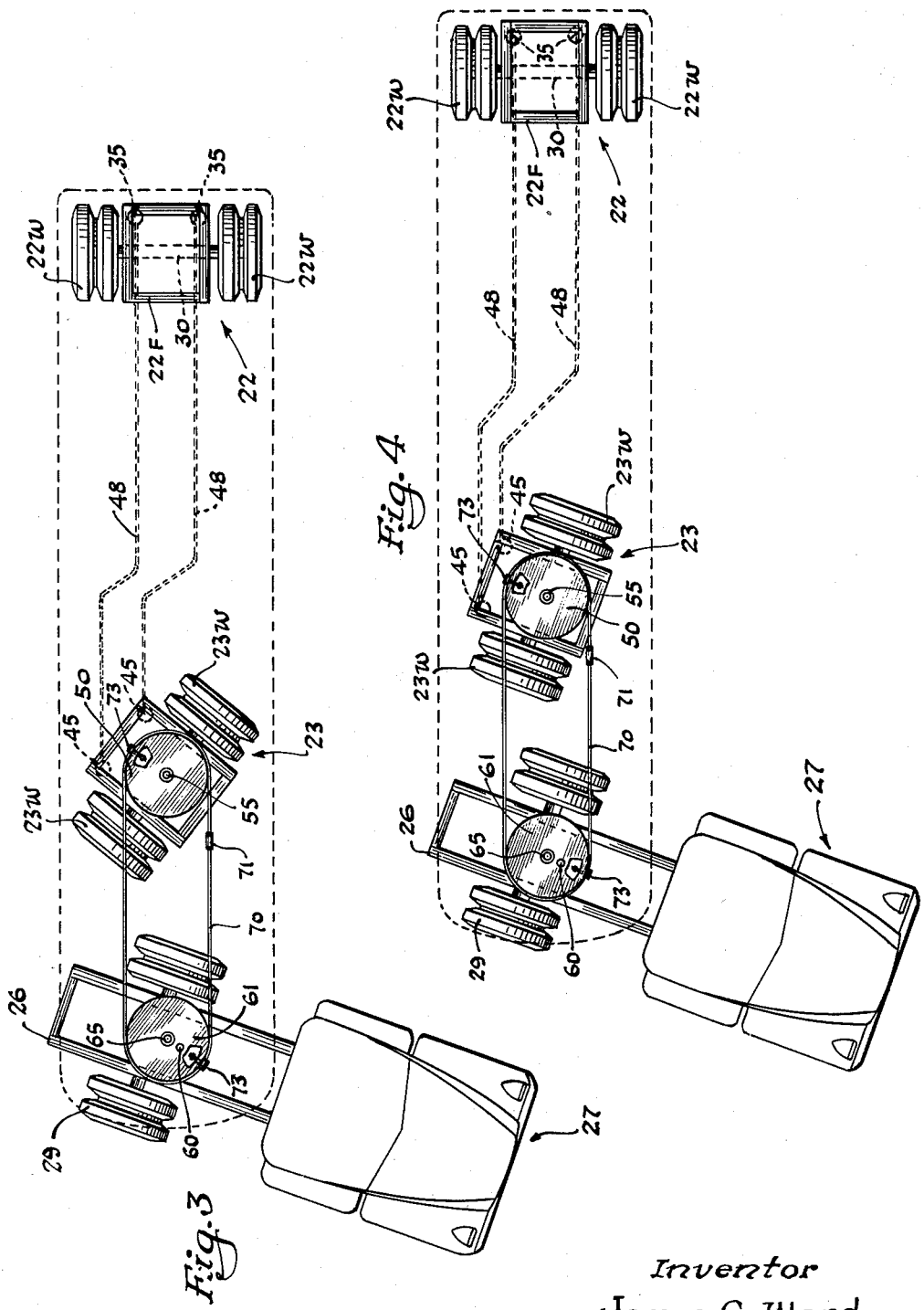

Sept. 13, 1955  J. C. WARD  2,717,787
SEMI-TRAILER STEERING MECHANISM
Filed Sept. 11, 1953  4 Sheets-Sheet 3
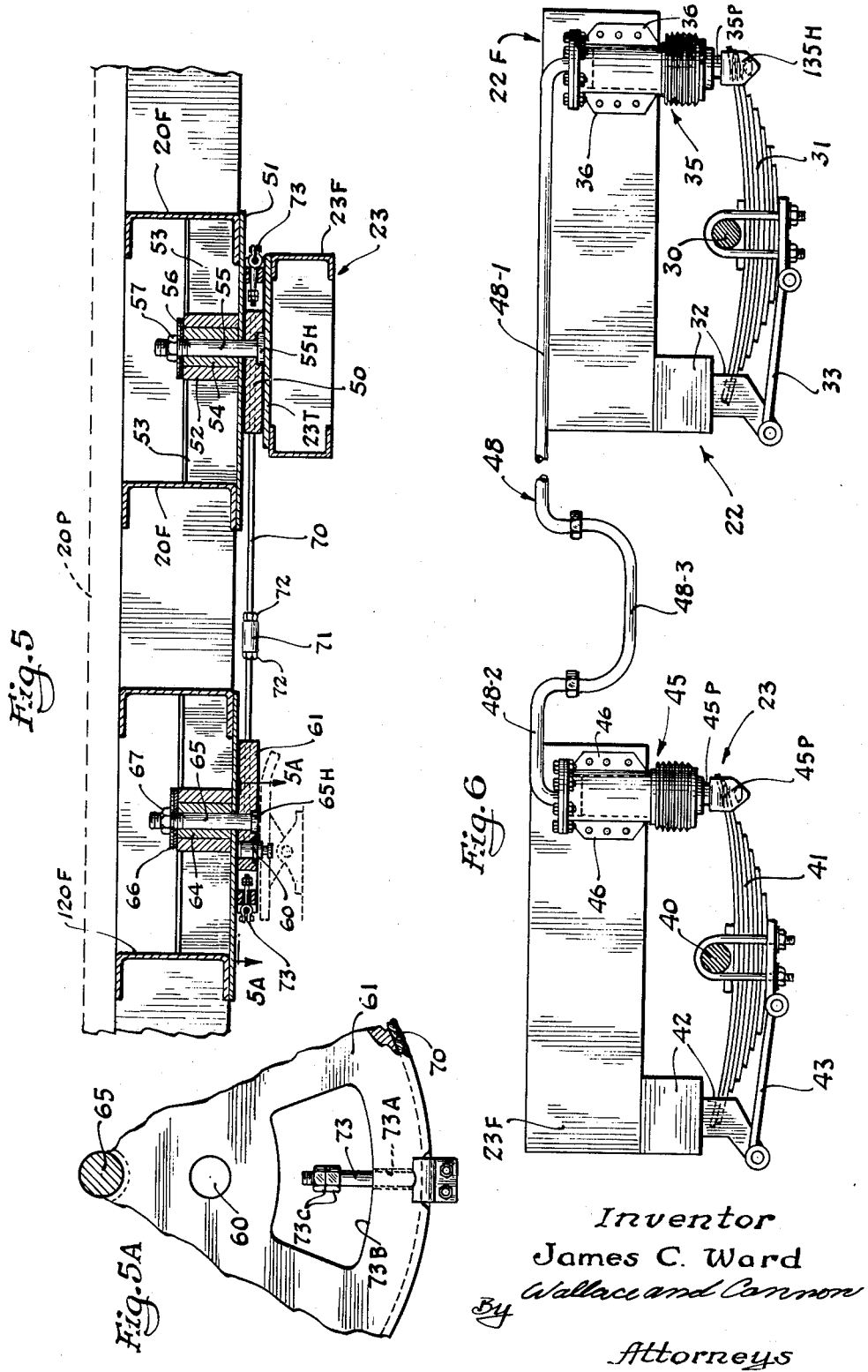
Inventor
James C. Ward
By Wallace and Cannon
Attorneys

United States Patent Office 2,717,787
Patented Sept. 13, 1955

2,717,787

SEMI-TRAILER STEERING MECHANISM

James C. Ward, Springfield, Mo., assignor to Reynolds Manufacturing Company, Springfield, Mo., a corporation of Missouri Application September 11, 1953, Serial No. 379,489

5 Claims. (Cl. 280—426)

This invention relates to semi-trailers of the kind used in tractor-trailer highway transports, and particularly, the invention relates to the wheel and axle arrangements in such semi-trailers.

In the highway transport industry, the size and axle loads of the equipment are rather rigidly governed by laws of the various states in which the equipment may be used, and in addition to limitations as to the maximum width, height and length of the vehicles, there are rather complicated and widely varying limitations as to the maximum gross vehicle load as well as limitations upon the load that may be applied to the individual axles of such vehicles. These load limitations, of course, vary among the several states, and as to maximum axle loads rather strict limitations are placed upon the equipment by certain states through the application of what are known as the "bridge laws." Under these bridge laws, the maximum load per axle is rendered dependent upon the spacing of adjacent axles of the vehicles, and the net result of these further limitations is that where the axles are located relatively close to one another, the maximum load that may be carried by such closely spaced axles is materially reduced. Thus, the equipment must satisfy a maximum gross vehicle load, a maximum gross vehicle load limited by overall spacing between the front and rear axles of the tractor-trailer unit, a maximum axle load, and a maximum axle load as modified and limited by axle spacing.

In the past, it has been found necessary in many instances where relatively heavy loads were to be transported to utilize what are usually known as tandem rear axle assemblies for semi-trailers, and these tandem assemblies have utilized at least two axles that were relatively closely spaced. This close spacing of the axles of such tandem axle structures has resulted in a marked limitation as to the allowable axle load that could be applied thereto, and hence where such tandem structures have been utilized, there has been a considerable sacrifice in respect to the load which would otherwise be legally allowable for these axles. In an effort to overcome this undesirable limitation upon tandem axle structures as heretofore used in semi-trailers, efforts have been made to attain a greater spacing between axles through the use of a trailing or caster type of mounting for one or the other of the axles of the tandem, but in practice, such structures have been found to be objectionable in many instances.

The limitations placed upon tractor-trailer units by the laws and regulations above discussed serve to impose limitations upon the manner of loading and distributing the load in a semi-trailer, because it will be recognized that it is desirable in every instance to attain the maximum gross vehicle load without exceeding the maximum axle load as to any axle of a particular vehicle. Thus, in the handling of dry cargo, as contrasted with liquid cargo that is loaded in tanker-type vehicles, in prior semi-trailers utilizing tandems with closely spaced axles, it has been necessary to avoid heavy loading in the forward end of the trailer body. Hence, such loading has usually been started so as to place a relatively light load in the forward end of the trailer with a progressively heavier load toward the rear end of the trailer. Following such a procedure, the operator may, and in many instances does, find that when the loading is completed, the maximum gross vehicle load has not been attained. In such an instance the operator must either reload the trailer, or transport the trailer with a load that is less than the maximum gross vehicle load, and either procedure involves monetary loss.

In view of the foregoing, it is the primary object of the present invention to afford a semi-trailer structure wherein a relatively great spacing may be utilized between two axles supporting a semi-trailer, and related objects are to afford a semi-trailer wherein a stationarily mounted rear axle is utilized closely adjacent to the rear end of the trailer body in conjunction with a steerably mounted leading axle spaced a substantial distance forwardly from the rear axle of the semi-trailer, and to afford simple and effective means for imparting the necessary steering movement to such leading axle.

Other and more specific objects of the present invention are to enable a steerable axle to be afforded on a semi-trailer in a forwardly spaced relationship with respect to the stationary rear axle thereof and to enable the steerable axle to have the steering movements imparted thereto in response to changes in the direction of application of the tractive forces that are applied to the semi-trailer by the tractor with which it is associated.

A further object is to afford a semi-trailer wherein the king pin is mounted for lateral shifting movement on and with respect to the body of the semi-trailer, to enable lateral shifting movements of the king pin to impart the desired steering movement to a steerable leading axle on the semi-trailer, and to attain such steering solely in response to a sensed need for corrective steering so as to produce proper tracking of the trailer and minimize tire wear.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

In the drawings:

Fig. 1 is a side elevational view of a semi-trailer embodying the features of the invention and in its operative association with a tractor;

Figs. 2, 3 and 4 are schematic plan views illustrating the tractor and semi-trailer in different relationships assumed in turning the unit;

Fig. 5 is a sectional view taken in a vertical plane and substantially along the line 5—5 of Fig. 2;

Fig. 5A is a plan section taken along the line 5A—5A of Fig. 5;

Fig. 6 is a side elevational view of the hydraulic load equalizing mechanism.

Figure 7:
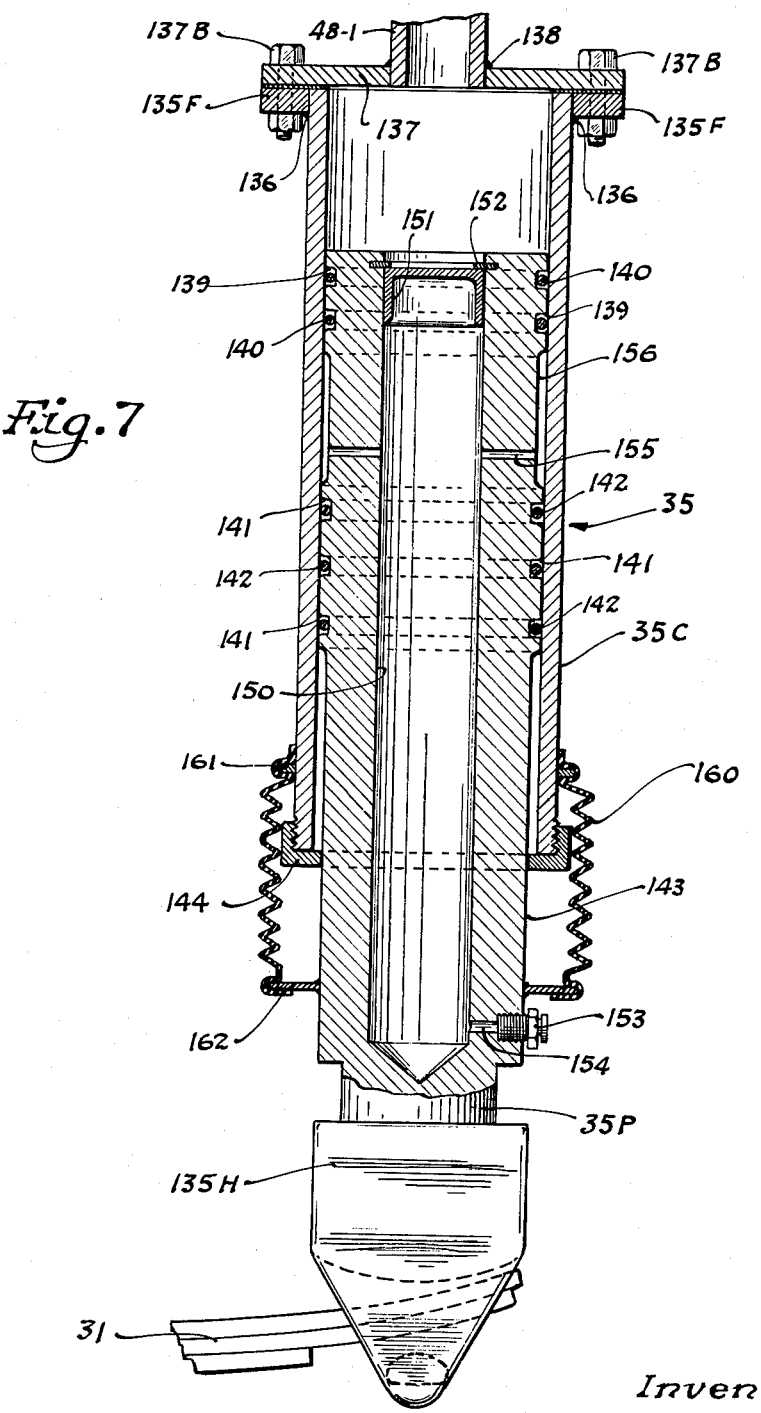
Fig. 7 is an enlarged detail view of the hydraulic cylinders utilized in the equalizing mechanism.

For purposes of disclosure, the invention is herein illustrated as embodied in a semi-trailer 20 which, in the present instance, has an enclosed body 21 that is built upon the usual platform 20P that forms the basic structural element of the semi-trailer. The semi-trailer 20 has rear running gear 22 with wheels 22W, intermediate running gear 23 with wheels 23W, and a king pin mechanism 24 whereby the forward end of the platform 20P may be associated with and supported on conventional fifth wheel mechanism 25 that is afforded on the deck 26 of a conventional tractor unit 27. The tractor unit 27 has steerable front wheels 28 and driven rear wheels 29 that are conventional in character and arrangement.

The rear running gear 22 has a conventional running gear frame 22F secured in fixed relation beneath and closely adjacent to the rear end of the platform 20P, and means are afforded for supporting a rear axle 30 in a transverse relationship beneath the running gear frame 22F. The wheels 22F are, of course, carried on the ends of the axle 30. Such means in the present instance comprise a pair of leaf springs 31 that are secured adjacent their midpoints to the axle 30 by conventional means, and the forward ends of the leaf springs 31 are mounted in downwardly projecting hanger bracket structures 32 that are secured adjacent the forward corners of the running gear frame 22F. Torque rods 33 are extended rearwardly from the hanger brackets 32 to the axle 30 to maintain proper alignment of the axle during its vertical movements. The rear end of each spring 31 is connected to the lower end of a piston 35P of a piston and cylinder unit 35, the cylinder 35C of which is mounted in fixed relation on the rear portion of the side of the running gear frame 22F by means of brackets 36, which may be secured as by welding to the frame 22F. It will be recognized that one such piston and cylinder device 35 is provided for the rear end of each of the springs 31, and these piston and cylinder units 35 are operatively associated with similar hydraulic structure that is afforded on and in association with the leading running gear 23 for purposes that will be hereinafter described.

The leading running gear 23 is, in most respects, quite similar to the rear running gear 22, and such leading running gear has a leading axle 40 which carries the wheels 23W and is associated with a pair of leaf springs 41 that are supported at their forward ends by means of hanger brackets 42 that extend downwardly from the forward corners of a leading running gear frame 23F. Similar torque rods 43 extend rearwardly from the hanger brackets 42 to the leading axle 40 to preserve alignment of this axle with respect to the running gear frame 23F. The rear ends of the springs 41 are connected to the downwardly projecting ends of pistons 45P that form a part of the piston and cylinder devices 45, the cylinders 45C of which are secured to the sides of the running gear frame 23F near the rear end thereof by means including mounting brackets 46. The upper ends of the corresponding cylinders 35C and 45C are connected together by a conduit 48 which includes a rigid rear section 48-1, a rigid forward section 48-2 and a flexible and relatively slack intermediate section 48-3 which enables steering movement to be applied to the leading running gear 23, as will now be described.

Thus, as shown in Fig. 5 of the drawings, the leading running gear 23 is steerably mounted beneath the platform 20P, and in accomplishing this the leading running gear frame 23F has a top wall 23T upon which a relatively thick circular steering plate 50 is secured in a fixed relation to the wall 23T. This steering plate 50 is disposed beneath and in bearing relationship with respect to a bearing plate 51 that is fixed to the bottom surface of the platform 20P so as to span the space between a pair of transverse frame members 20F of the platform 20P. Above the bearing plate 51, a bearing house 52 in the form of a vertical sleeve secured in a fixed relation as by welding to a plurality of spacing members 53 that are extended between the frame members 20F, and within this sleeve 52 a sleeve bearing 54 is mounted to receive a vertical bearing or pivot pin 55. This bearing pin has its head 55H recessed into the lower face of the steering plate 50, and extends upwardly through the plate 50 and the bearing plate 51 and through the bearing sleeve 54. A washer 56 and a nut 57 on the upper end of the pin 55 act to hold the leading running gear 23 in a proper steerable relationship with respect to the platform 20P, and it is to be observed that the bearing pin 55 is disposed in the vertical plane passing through the longitudinal axis of the platform 20P.

Under and in accordance with the present invention, means are afforded for imparting steering movements to the steerable leading running gear or axle in accordance with the steering movements of the tractor 27, and this is accomplished by affording a king pin connection on the semi-trailer that provides for lateral shifting movement of the king pin with respect to the center line of the semi-trailer. Under the present invention, these lateral shifting movements are attained in response to the application of tractive effort to the king pin by the tractor 27. Thus, as herein shown, and particularly in Fig. 5 of the drawings, a king pin 60 is afforded in a downwardly projecting relationship on a control plate 61 that is disposed adjacent to the forward end of the platform 20P. The control plate 61 is circular in character, and is of substantially the same size as the steering plate 50 hereinbefore described. This control plate 61 has an upwardly projecting mounting pin 65 that extends through the plate 61 with an enlarged head 65H disposed beneath and in recessed relationship with respect to the plate 61. The mounting pin 65 extends upwardly through a bearing sleeve 64 that is mounted in the same manner as the bearing sleeve 54 between a pair of frame members 120F of the platform structure. A retaining washer 66 and a retaining nut 67 serve to hold the mounting or pivot pin 65 in position, and this pivot pin 65 is located in the vertical plane that defines the longitudinal axis of the semi-trailer.

The king pin 60 is mounted on the control plate 61 so as to project downwardly therefrom and the king pin 60 is located eccentrically with respect to the rotative axis 65 of the control plate 61. The control plate 61 is operatively associated with the steering plate 50 of the leading axle in such a way that steering movements may be imparted to the leading axle by movement of the control plate 61 about its axis 65. In the present instance, such operative association is attained by means of a cable 70 that is extended about the two plates 50 and 61 and which has its ends connected by an adjusting turn buckle 71, having lock nut 72 associated therewith. The cable 70 is fixed to each of the plates 50 and 61 by anchoring pins 73 that are so mounted that the plates may move through somewhat over 90 degrees of rotation.

The pins 73 are mounted in the same manner in both plates 50 and 61, and as shown in Fig. 5A, radially through an opening 73A into a clearance space 73B where the inner end of the bolt has a stop formed by nuts 73C. The cable 70 is anchored to the outer end of the pin 73, and due to outward sliding movement through the opening 73A as limited by the nuts 73C, the added rotative movement over 90° is permitted.

When the leading axle 40 is at right angles to the longitudinal axis of the trailer, the king pin 60 is disposed on such longitudinal axis as will be evident in Fig. 2 of the drawings, and when the king pin 60 has been associated with the fifth wheel mechanism 25 of a tractor 27 in the conventional manner, the application of the normal tractive forces will maintain the king pin in this normal relationship so that the leading axle 40 will be held in its normal position at right angles to the axis of the trailer. When, however, the operator commences a turning operation by steering the front wheels 28 of the tractor, the longitudinal axis of the tractor will gradually change with respect to the axis of the trailer, so that it may assume the relationship shown in Fig. 2 of the drawings.

The angular relationship of the forwardly moving tractor 27 with respect to the trailer 20 becomes effective in a controlled manner to impart steering movement to the leading running gear 23 in accordance with the balance of lateral forces acting between the trailer and the tractor, and this balance of forces is governed in a large measure by the resistance of the wheels 23W of the leading running gear 23 to lateral shifting or skidding movements on and with respect to the roadway. Any such tendency of the wheels 23W to skid laterally constitutes an accurate measure of the need for corrective steering action on such wheels, and in the trailer of the present invention, the corrective steering action takes place in response to what may be said to be a sensing of the need for corrective steering. In other words, the tractor 27, after it has assumed an angular relationship with respect to the trailer, tends to move the forward end of the trailer laterally, but this is resisted by the reaction of the wheels 23W against the roadway, and the tractor 27, by reason of its angular position with respect to the trailer, thus applies components of force that may be considered as being lateral or transverse with respect to the trailer body. When this component of force is sufficient to overcome the friction of the various bearing parts in the steering mechanism, the tractor 27 will be effective to move the king pin 60 laterally so as to produce a rotative displacement of the control plate 61. This will, of course, cause a corresponding steering movement of the leading running gear 23 to take place. Such steering movement thus takes place only as the need for corrective steering is sensed as aforesaid, and the tractor assumes its angular position and the trailer follows with a proper tracking action such that objectionable skidding and wear on the tires are avoided. Premature steering movement of the leading running gear 23 is thus avoided under the present invention, and the extent of the steering movement that is imparted to the leading running gear 23 is governed by the balance of lateral forces in such a way that the steering movement is controlled and limited to the desired or proper amount which will cause proper tracking of the parts of the tractor-trailer combination.

Under the present invention the tractive or towing forces are applied to the trailer through the eccentrically located king pin 60 so that in normal travel along the highway, the tractive forces act to maintain the leading running gear 23 in the proper transverse relation with respect to the trailer, and this imparts unusual lateral stability to the tractor-trailer combination, and it eliminates the highly objectionable and dangerous jack-knifing tendencies that are normally present in semi-trailer tractor combinations. One aspect of the controlled positioning of the leading running gear 23 is that if the presence of a bump or obstruction in the road tends to displace the leading running gear 23 from its proper lateral position, such displacement is effectually resisted and overcome by the forward tractive forces that are applied to the king pin 60. In other words, the king pin 60 cannot, under such circumstances, be shifted laterally without corresponding lateral displacement of the entire rear end of the tractor, and hence the weight on the fifth wheel and the reaction of the wheels 29 against the roadway serve to counteract any tendency of the leading running gear 23 in such an instance to be displaced from its proper position. Hence, the inherent forces that come into play in normal high-speed operation of the tractor-trailer combination on the highway all work toward maintenance of lateral stability of the entire unit, thus to promote safety of operation.

As pointed out hereinabove, the piston and cylinder units 35 and 45 are substantially identical in form and construction, and for purposes of disclosure, the piston and cylinder device 35 will be described in detail, and this structure is illustrated best in Fig. 7 of the drawings. Thus, it will be noted that the cylinder 35C is formed from a tubular member which has a separately formed annular flange 135F secured thereto at its upper end as by welding at 136. The upper end of the cylinder 35C is closed by a disk-like end plate 137 which is bolted in place against the flange 135F by means such as bolts 137B so as to close the upper end of the cylinder. The rigid pipe section 48-1 is extended through a central opening in the end plate 137 and is welded to the end plate as at 138.

The piston 35P is made from bar stock which at its inner end is turned to a diameter complemental to the internal surface of the cylinder 35C. Adjacent the inner end of the piston 35P a pair of spaced annular grooves 139 are formed, and in these grooves oil sealing means are mounted. These oil sealing means in the present instance are afforded by O rings 140. Spaced a substantial distance from the O rings 140, additional annular grooves 141 are formed in the piston 35P and O rings 142 are mounted in these grooves to afford additional sealing means. Beyond the lower groove 141, as viewed in Fig. 7 of the drawings, the piston is reduced as at 143, and an annular collar 144 is threaded onto the lower end of the cylinder 35C to act as a stop to limit the outward or downward withdrawing movement of the piston 35P with respect to the cylinder 35C. Beyond the reduced portion 143, the piston has an enlarged head 135H which is formed to afford a spring hanger through which the adjacent end of the spring 31 projects in a slidable relationship in accordance with standard practice.

In the piston and cylinder device 35 means are provided for reducing and minimizing leakage of hydraulic liquid, and such means are afforded in the present instance by providing a longitudinal bore or cylinder 150 that extends from the inner end of the piston 35P substantially to the lower head 135H. Within this cylinder 150, a secondary piston 151 is slidably mounted, and this piston is limited as to its movement in an upward direction, as viewed in Fig. 7, by means of a stop ring 152 that is set into the wall of the cylinder 150. The cylinder 150 is arranged to be filled with a relatively heavy lubricant that is loaded into the cylinder 150 through a check valve fitting 153 that communicates through a transverse bore 154 with the cylinder 150. Thus, when the lubricant is forced into the cylinder 150 through the check valve 153, the piston 151 is forced upwardly toward the limiting position defined by the stop ring 152. The pressure of the hydraulic fluid within the main cylinder 35C acts, of course, against the piston 151, and this is effective to force the heavy lubricant from the cylinder 150 outwardly through lateral bores 155 and into a relatively wide annular groove 156 that is formed in the piston 35P intermediate the grooves 139 and 141. Hence, the heavy lubricant within the annular groove 156 is under a pressure at all times which corresponds with the pressure that is effective within the cylinder 35C, and the presence of this heavy lubricant under pressure serves to minimize the leakage of hydraulic liquid from the cylinder 35C. Any leakage of hydraulic fluid that does occur may, however, be compensated for by addition of more lubricant through the check valve 153.

As shown in Fig. 7 of the drawings, a flexible corrugated dust shield 160 is afforded between the lower end of the cylinder 35C and the piston 35P, and this dust shield is anchored at its opposite ends on the cylinder 35C and the piston 35P by anchoring rings 161 and 162 that are secured as by welding to these parts.

With the piston and cylinder devices 35 and 45 interconnected on each side of the trailer, the hydraulic systems serve to equalize the loads on the connected parts of the running gear 22 and 23. Thus, for example, where the wheel 23W on one side of the trailer runs over a raised point in the roadway, the increased pressure in the related piston and cylinder device will cause the connected piston and cylinder device 35 to be extended so as to lower the corresponding wheel 22W and cause equalization of the load between these two wheels 22W and 23W. The same sort of equalizing result will follow in response to a roadway elevation that becomes effective on a rear wheel 22W, with the result that substantially equal load distribution is attained between the related wheels of the trailer.

From the foregoing description, it will be evident that the present invention enables trailers to be loaded more easily and with greater assurance that the maximum gross load will be attained, while at the same time satisfying the axle load limitations imposed by the various laws relating to highway transportation. The present invention, through enabling the load to be more uniformly distributed throughout the loading space of a trailer, serves to promote stability of the tractor-trailer unit when it is in operation on the road, and the arrangement is such under the present invention as to assure stability of the tractor-trailer unit in high speed operation on the open road. In particular, it will be evident that the trailer structure of the present invention avoids all possibility of jack-knifing of the tractor-trailer combination. Moreover, by promoting stability of the tractor-trailer operation and assuring attainment of the maximum gross vehicle load, the present invention enables more profitable commercial operation of such tractor-trailer units to be attained.

An important aspect of the present invention is also to be found in the fact that the steerable leading axle is afforded on a semi-trailer in such a way that the structure may cooperate with the conventional type of tractor and fifth wheel structures.

It will also be evident that the present invention affords a steerable leading axle structure for a semi-trailer wherein perfect steering control is attained with respect to such leading axle, and the leading axle is subjected to steering operations under a governing action that is sensitive to the forces which measure and detect the need for steering of such axle. As a result, the tractor-trailer unit tracks properly and efficiently and in such a way as to avoid excessive wear upon the tires of the equipment.

It will also be evident that the present invention affords a novel means for equalizing the load upon spaced axles of highway transport equipment, and that the hydraulic equipment which effects such equalization under the present invention is capable of operation under extremely high pressures without excessive leakage of hydraulic fluid. Moreover, it will be evident that where such leakage does occur, the present invention simplifies the compensation for such leakage, and this compensation may be accomplished by relatively simple operations that may be performed in almost any garage or filling station such as those found along commercial highway transport routes.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a semi-trailer adapted for connection with the conventional fifth wheel of a tractor to afford a tractor-trailer combination for highway transport purposes, said semi-trailer comprising an elongated load-bearing platform having front and rear ends, a rear axle mounted transversely beneath said rear end of said platform, a steerable leading axle mounted beneath said platform a substantial distance forwardly of said rear axle and spaced a substantial distance rearwardly of said front end of said platform, load equalizing means operatively connected between said axles to equalize the load on such axles, a control plate mounted beneath the front end of said platform for rotative movement about a vertical axis disposed on the central longitudinal axis of said platform, a king pin extended downwardly from said control plate eccentrically thereof for tractive cooperation with the fifth wheel of a tractor, and means operatively connecting said control plate with said leading axle to impart steering movement to said leading axle in accordance with rotative displacement of said control plate.

2. In a semi-trailer adapted for connection with the conventional fifth wheel of a tractor to afford a tractor-trailer combination for highway transport purposes, said semi-trailer comprising an elongated load-bearing platform having front and rear ends, a rear axle mounted transversely beneath said rear end of said platform, a steerable leading axle mounted beneath said platform a substantial distance forwardly of said rear axle and spaced a substantial distance rearwardly of said front end of said platform, steering means affording a winding surface concentric with the steering axis of said leading axle and operatively associated therewith for imparting steering movements thereto, load equalizing means operatively connected between said axles to equalize the load on such axles, a control plate mounted beneath the front end of said platform for rotative movement about a vertical axis disposed on the central longitudinal axis of said platform, means on said control plate affording a winding surface concentric with said vertical axis, a king pin extended downwardly from said control plate eccentrically thereof for tractive cooperation with the fifth wheel of a tractor, and flexible connecting means extending about at least portions of the winding surfaces of said steering means and said control plate to impart steering movement to said leading axle in accordance with rotative displacement of said control plate.

3. In a semi-trailer, an elongated load bearing platform having front and rear ends, a fixed transverse axle mounted on and beneath said platform adjacent to the rear end thereof, a leading axle steerably mounted on and beneath said platform intermediate said fixed axle and the front end of said platform, load equalizing means acting between said axles, a control member mounted for pivotal movement on a vertical axis beneath the front end of said platform and extending forwardly from said axis for lateral shifting movement about the axis, a king pin mounted in downwardly projecting relation on said control member forwardly of said axis for imparting forward pull to said platform and for swinging said control member laterally in response to tractive forces applied to said king pin, and means operatively connecting said control member and said leading axle to apply steering movements to said leading axle in accordance with such lateral shifting of said king pin.

4. In a semi-trailer, an elongated load bearing platform having front and rear ends, a fixed transverse axle mounted on and beneath said platform adjacent to the rear end thereof, a leading axle steerably mounted on and beneath said platform intermediate said fixed axle and the front end of said platform, a control member mounted for pivotal movement on a vertical axis beneath the front end of said platform and extending forwardly from said axis for lateral shifting movement about the axis, a king pin mounted in downwardly projecting relation on said control member forwardly of said axis for imparting forward pull to said platform and for swinging said control member laterally in response to tractive forces applied to said king pin, and means operatively connecting said control member and said leading axle to apply steering movements to said leading axle in accordance with such lateral shifting of said king pin.

5. In a semi-trailer, an elongated load bearing platform having front and rear ends, a fixed transverse axle mounted on and beneath said platform adjacent to the rear end thereof, a leading axle steerably mounted on and beneath said platform intermediate said fixed axle and the front end of said platform, a control member pivotally mounted on and projecting forwardly from a vertical axis and located beneath the front end of said platform for lateral shifting movement about such axis, a king pin projecting downwardly from said control member forwardly of said axis and through which tractive forces may be applied to said control member to pull said trailer and apply shifting movements to said control member about said axis, and means operatively connecting said control member and said leading axle to apply steering movements to said leading axle in proportion to such shifting of said control member.

References Cited in the file of this patent

UNITED STATES PATENTS

| | | |
|---|---|---|
| 1,745,431 | Marcum | Feb. 4, 1930 |
| 2,094,882 | Garnett et al. | Oct. 5, 1937 |
| 2,131,760 | Schaefer | Oct. 4, 1938 |
| 2,249,402 | Stefano | July 15, 1941 |
| 2,359,978 | Edwards | Oct. 10, 1944 |
| 2,401,687 | Letzkus | June 4, 1946 |
| 2,433,269 | Fellabaum | Dec. 23, 1947 |
| 2,560,501 | Webster | July 10, 1951 |
| 2,638,358 | Larison | May 12, 1953 |
| 2,662,782 | Wilson | Dec. 15, 1953 |

FOREIGN PATENTS

| | | |
|---|---|---|
| 547,810 | France | Oct. 3, 1922 |